(12) United States Patent
Rosenberg et al.

(10) Patent No.: US 8,416,365 B1
(45) Date of Patent: Apr. 9, 2013

(54) DIFFUSIVE DISPLAY DEVICE

(76) Inventors: Ilya D. Rosenberg, Mountain View, CA (US); Joseph J. Hebenstreit, San Francisco, CA (US)

(*) Notice: Subject to any disclaimer, the term of this patent is extended or adjusted under 35 U.S.C. 154(b) by 262 days.

(21) Appl. No.: 12/980,246

(22) Filed: Dec. 28, 2010

(51) Int. Cl.
*G02F 1/1335* (2006.01)
*G02F 1/1347* (2006.01)

(52) U.S. Cl.
USPC .................. 349/64; 349/9; 349/74; 349/96

(58) Field of Classification Search ............... 349/9, 64, 349/74, 84, 96, 112
See application file for complete search history.

(56) References Cited

U.S. PATENT DOCUMENTS

| | | | |
|---|---|---|---|
| 7,282,245 B2* | 10/2007 | Iftime et al. | 428/1.1 |
| 7,417,781 B2* | 8/2008 | Tonar et al. | 359/267 |
| 7,425,794 B2* | 9/2008 | Adachi | 313/112 |

\* cited by examiner

*Primary Examiner* — Mike Qi
(74) *Attorney, Agent, or Firm* — Lee & Hayes, PLLC

(57) ABSTRACT

A diffusive display, such as a polymer network liquid crystal display (PNLCD) and a visible wavelength light polarizer are combined to form a diffusive display device. The diffusive display device may provide black and white or color presentation with refresh rates suitable for playback of animation or full motion video using ambient or emitted light. By altering a state of the diffusive material, such as polymer network liquid crystals, between a scatter state and a clear state an image may be generated.

38 Claims, 13 Drawing Sheets

DIFFUSIVE DISPLAY DEVICE

BACKGROUND

Electronic displays are found in electronic devices such as electronic book readers ("e-book readers"), cellular telephones, personal digital assistants (PDAs), portable media players, tablet computers, netbooks, desktop computers, televisions, and so on. The electronic displays of these devices present information, operational status, and content items such as books and movies to viewers.

Conventional electronic displays are emissive or reflective. Reflective displays operate predominately by changing the reflectance of light incident to their surface. Reflective displays typically require very little or no power after the formation of an image, making them useful in mobile applications, such as e-book readers, where battery power is limited. Reflective displays also provide good visibility in bright conditions, such as sunlight. Unfortunately, reflective displays typically have slow refresh rates, may require special front or side-lighting to remain usable in dark conditions, and, in some instances, do not render color.

Emissive displays produce their own light, and traditionally offer higher refresh rates and color output, but may washout and become less visible in bright light such as sunlight. Additionally, emissive displays constantly consume power during operation in order to emit the light.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicate similar or identical items.

FIG. 3 illustrates another implementation of the diffusive display coupled to the emissive display with the polarizer in between.

DETAILED DESCRIPTION

Figure 1:
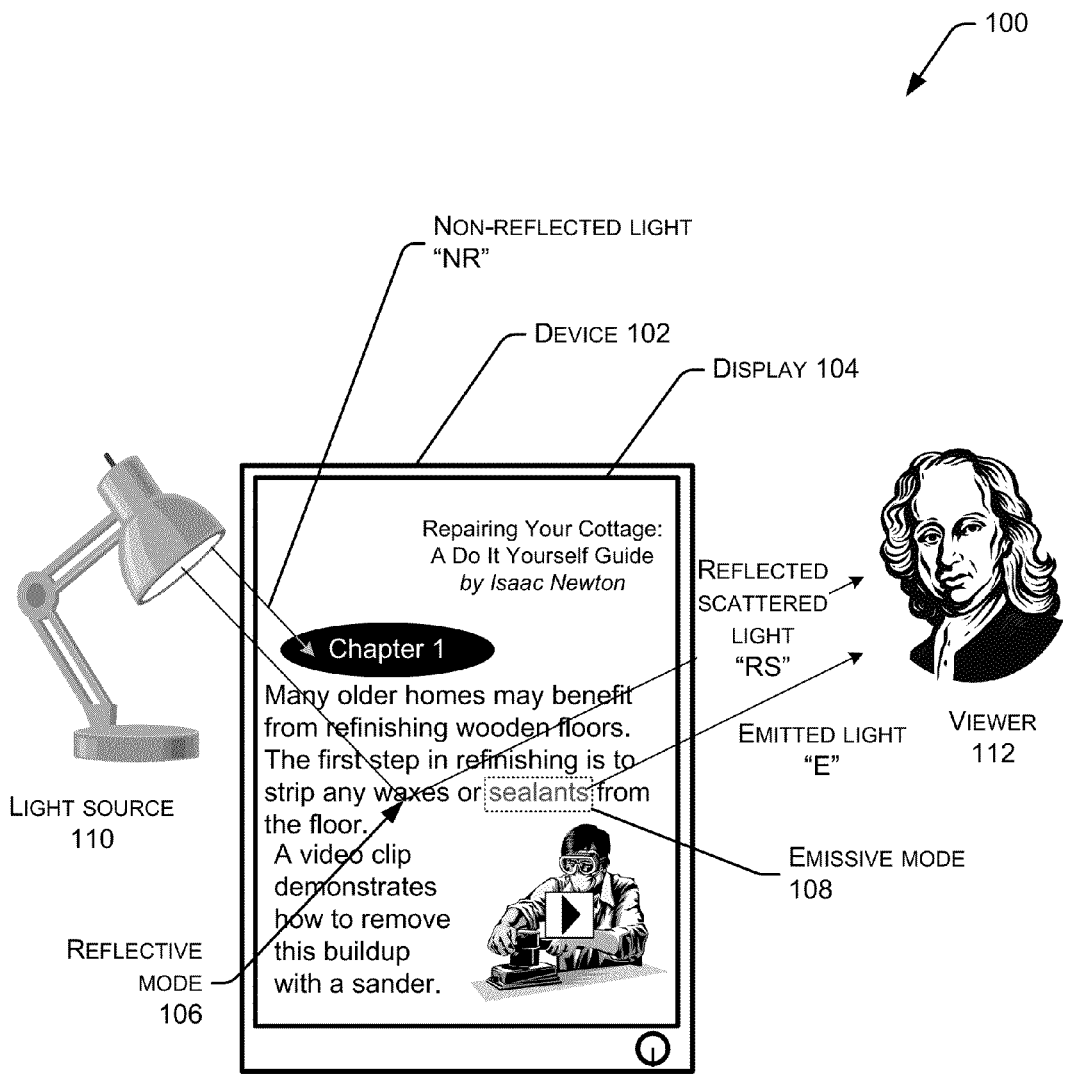
FIG. 1 represents an example environment for use of a display device incorporating a diffusive display, such as a polymer network liquid crystal display (PNLCD).

Low power consumption combined with fast refresh rates suitable for animation and video presentation are realized by utilizing a diffusive display device described in this disclosure. Diffusive displays comprise polymer network liquid crystal displays (PNLCD), cholesteric displays, electrowetting, and so forth. These diffusive displays contain diffusive materials, such as polymer network liquid crystals, cholesteric materials, organic compounds, and so forth. Diffusive displays may be configured to provide at least two states: a clear state and a scatter state. In the clear state light may pass through the diffusive display with no or minimal changes to polarization or other characteristics of the light. In the scatter state light passing through the diffusive display is affected more significantly. As a result, the polarization or other characteristics of at least a portion of the incident light may be affected. In some implementations, a portion of the diffusive display in the scatter state may appear to be a milky white due to the scattering of incident light. The diffusive display may be combined with a reflective backing, such as a mirror, to improve performance. These characteristics of the diffusive display may be exploited to produce displays capable of providing full motion color by using ambient light, emitted light, or a combination of the two.

The diffusive display may be combined with an emissive display. The emissive display is configured to emit light, rather than use only incident light. The emissive display may comprise an organic light emitting diode display (OLEDD), a light emitting diode display (LEDD), a plasma display, a laser projection system, and so forth.

By coupling the diffusive display and the emissive display with a polarizer, rapid and effective control over incident and emitted light is possible. Circular polarizers may be used in some implementations. For example, circular polarizing filters are effective at absorbing reflected light. This is because the polarity of light reverses upon reflection. Consider a circular polarizing filter configured to pass light with a left-handed polarity and positioned in front of a mirror. Ambient light falling upon the polarizing filter contains left and right-handed polarity. The circular polarizing filter in this example passes left-handed polarity light, but blocks the right-handed polarity. That left-handed polarity light reflects off of the mirror, and as a result of the reflection now exhibits a right-handed polarity. The circular polarizing filter, configured to only permit left-handed polarity light, blocks this reflected light which now has a right-handed polarity.

This ability to block reflected light may be combined with the scatter state of the diffusive display to control light. Consider the above example, but now with the diffusive display between the circular polarizer and the mirror. When in the clear state, the incident light proceeds as described above and ultimately is not reflected to a user. However, in the scatter state the material in the diffusive display, such as liquid crystals in a PNLCD, affects light passing through the diffusive display altering characteristics such as the polarity. As a result, at least a portion of the light passing through the scatter state diffusive display has its polarity affected. Continuing the example above, at least some of the light reflected from the mirror that now exhibits a right-handed polarity interacts with the scatter state diffusive display and exhibits a shift to left-handed polarity. As a result, the left-handed polarity is able to pass the circular polarizer and can be seen by the user.

When coupled with an emissive display, such as an OLEDD, the display device may be configured to operate in a reflective, emissive, or combination mode. For example, when ambient light level is above a pre-determined threshold which would wash out an emissive display, the controlled scattering and non-reflectance of incident may be used to generate an image. When the ambient light is below the pre-determined threshold, or when colored screen elements are called for, the emissive display may be used to generate an image. When the ambient light is in an intermediate range, both emissive and reflective modes may be used simultaneously. In some implementations, the emissive display may be used to backlight the reflective modes.

In another implementation the diffusive display couples to colored reflective surfaces or a reflective surface with color filters to generate color images from ambient light. A pixel may comprise a plurality of sub-pixels, each configured to generate a particular color. Control of the states of the diffusive display thus generates different colors for a given pixel.

Where reflective and emissive modes are available in the display, a display control module may select one or both of the modes for use depending upon factors such as refresh rate, power consumption, presence of color, presence of video, ambient conditions, and so forth.

For example, consider a portable electronic device such as an e-book device. The user may begin reading a book outside in bright daylight, during which the display is operating in the reflective move. As the weather grows cloudy, and the ambient light dims, the emissive mode contributes to the image. As night falls and the ambient light disappears, the display switches to a predominately emissive mode.

The display may also adapt to variations in the spectrum of the ambient light to allow for color correction. For example, without color correction a reflective display presenting a color image under an orange sodium vapor arc light would have colors significantly distorted, and may only be visible as a black and white image due to the ambient light. However, with color correction based at least in part upon the spectrum of the ambient light, the selection of particular sub-pixels to generate color may be changed. Additionally, an emissive portion of the display may provide light of a particular color which is insufficient in the ambient light to provide color rendering. For example, under the ambient orange arc light the emissive portion may provide green and blue light.

Illustrative Environment

FIG. 1 represents an illustrative environment 100 for use of a display comprising a diffusive display of diffusive material. In environment 100, a device 102 such as an e-book reader, portable media player, laptop, desktop computer display, or the like has a display 104 which produces an image. This image may reproduce textual information, pictures, video, and/or any other content that can be visually rendered and consumed. The display 104, or portions of the display 104, may operate in a reflective mode 106, an emissive mode 108, or in some instances both modes at the same time. While in the reflective mode 106, elements of the diffusive display may present at least two states. In one configuration, a clear state of the diffusive material results in a non-reflective state, while a scatter state of the diffusive material results in a reflective state.

In the reflective state, light emitted from a light source 110, such as a table lamp or any other light (e.g., sunlight), may be non-reflected ("NR") or absorbed. Conversely, light from the light source 110 may be reflected ("R") off of the surface substantially towards a viewer 112.

Additionally, all or a portion of the display 104 may be operated in the emissive mode 108. In the emissive mode 108, pixel elements generate their own light ("E"), which originates from the display 104 and is directed substantially towards the viewer. A pixel element (or "pixel") may include an element that emits photons such as an organic light emitting diode, plasma display, combination of liquid crystal and backlight, and so forth. For example, an emissive display may emit light from a light emitting diode which comprises a circuit element that emits photons when passing an electric current. In general, emissive technologies utilize electrical energy to produce photons.

As described below, portions of or the entire display may generate images using the reflective mode 106, the emissive mode 108, or both while viewer 112 operates device 102 to consume content. For instance, suppose the viewer 112 is viewing an e-book about home repair by Isaac Newton on the display 104. In this example, device 102 may employ the reflective mode 106 while displaying the text on the display, as this provides a strong visual similarity to the "ink-on-paper" experience while consuming minimal power. In one implementation where the reflective mode 106 provides for black and white images, a colored highlight such as the word "sealants" indicating a hyperlink may be provided by pixels operating in the emissive mode 108.

The size and location of the portion of the display 104 that may operate in the reflective mode 106 or the emissive mode 108 may vary. For example, as described above, colored text may be generated using the emissive mode 108, while black text is rendered in the reflective mode. Furthermore, the reflective mode 106 and the emissive mode 108 may be combined and utilized in the same pixel, as described below.

Illustrative Construction and Operation

Figure 2:
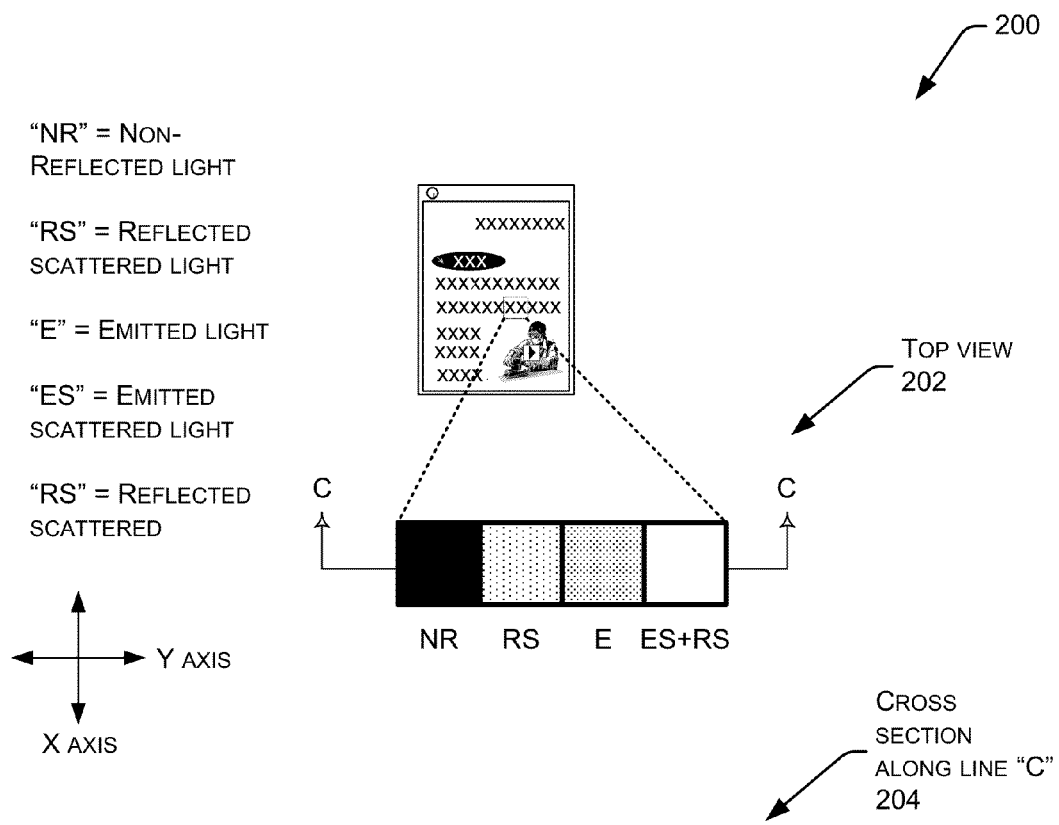
FIG. 2 illustrates a diffusive display combined with an emissive display and a polarizer coupled to the diffusive display on a side opposite the emissive display.

FIG. 2 illustrates a display 200 comprising a diffusive display combined with an emissive display and a polarizer coupled to the diffusive display on a side opposite the emissive display.

In this and the following figures, the display elements ("elements") used to generate pixels are shown as being approximately the same size with one another. However, in some implementations these display elements may vary in size. For example, a reflective display element may be larger than an emissive display element, or vice versa.

A top view 202 depicts a row of four elements from the perspective of the viewer 112 looking straight down at the display 104. In this view, the shading of the elements illustrates variations of the appearance of the elements to the viewer 112. From left to right, the elements are configured in the following conditions: Non-Reflective (NR), Reflect Scattered (RS), Emitted (E), and Emitted Scattered (ES) plus RS (ES+RS). A cross section of these elements along line "C" is shown at 204.

Cross section 204 illustrates that the display 200 comprises an emissive display 206 layer comprising emissive display elements. The emissive display 206 generates an image by producing light and emitting that light upwards towards the viewer 112. Example emissive displays include, but are not limited to, light emitting diode displays (LEDD), organic LEDs displays (OLEDDs), backlit liquid crystal displays (LCD), plasma displays, microelectromechanical system (MEMS) displays, electroluminescent displays, quantum dot displays, field emission displays, and so forth.

At a given moment, elements of the emissive display 206 may reside in either an active or inactive state. Emissive elements in an active state 208 emit light, while emissive elements in an inactive state 210 do not. In this and the following figures, a crosshatch pattern indicates emissive elements in the active state 208 while shading indicates emissive elements in the inactive state 210.

Arrows labeled "E" and originating in the emissive elements indicate emission of light by an emissive element in an active state. Emitted light "E" from the emissive display 206 may pass through a diffusive display 212, such as a PNLCD.

The diffusive display 212 may be configured between at least two states, a clear state 214 and a scatter state 216. In the clear state 214 light may pass through the diffusive display 212 with no or minimal changes to polarization or other characteristics of the light. In the scatter state 216 light passing through the diffusive display 212 is more affected. As a result, the polarization or other characteristics of the light may be affected. In some implementations, a portion of the diffusive display 212 in the scatter state 216, and in front of an emissive element in the inactive state 210, may appear to be a milky white due to the scattering of incident light. The diffusive display 212 may be combined with a reflective backing, such as a mirror, to improve performance. In some implementations, an interface between the diffusive display 212 and the emissive display 216 may act as a suitable reflector of incident light.

A polarizer 218, such as a circular polarizer, couples to the diffusive display 212. Circular polarizers are effective in absorbing reflected light. This is because the polarity of light reverses upon reflection. For example, consider the polarizer 218 is configured to pass light with a left-handed polarity and positioned in front of a mirror. Ambient light falling upon the polarizer 218 contains left and right-handed polarity. The polarizer 218 in this example passes left-handed polarity light, but blocks the right-handed polarity. Unfettered by the diffusive display 212 that is in the clear state 214, the left-handed polarity light reflects off of the reflective interface between the diffusive display 212 and the emissive display 206 and as a result of the reflection, now exhibits a right-handed polarity. The polarizer 218, which is configured to only permit left-handed polarity light, blocks this reflected light which now has a right-handed polarity. This situation is illustrated in the left-most display element, in which at least a portion of the incident light passes through the polarizer 218, reflects from the interface between the diffusive display 212 and the emissive display 206, and is blocked by the polarizer 218. To the user, this pixel appears to be black because the ambient light is not reflected and the underlying emissive display 206 element is inactive 210. In other implementations other polarizers may be used.

A display element, which is second from the left, also has the emissive display 206 element in an inactive state 210, but the diffusive display 212 is in the scatter state 216. As a result, the polymer network liquid crystals interact with the incident light and scatter it. This scattering affects the polarity of the incident light. Continuing the example above, the left-hand polarized light that has passed through the polarizer 218 is scattered, and at least some of the incident light undergoes a change in polarity. As a result of this shift in polarity, at least a portion of the incident light is reflected back through the polarizer 218 to the user.

A display element, which is third from the left in this illustration, is shown with the diffusive display 212 in the clear state 214 and the emissive display 206 element in an active state 208. As with the leftmost display element, the incident light is not-reflected. However, at least a portion of the emitted light E passes the polarizer 218. As a result, the viewer 112 sees this pixel glowing.

A rightmost display element depicts the diffusive display 212 in the scatter state 216 and the emissive display 206 element in an active state 208. As described above, incident light is scattered by the scatter state 216 of the diffusive material, and at least a portion of that light reflects back towards the user. The emitted light itself is scattered, and at least a portion of that light is transferred through the diffusive display 212 and the polarizer 218 to the viewer 112. In some implementations where the scatter state 216 within the diffusive display is anisotropic, incident light from above may be predominately scattered, while emitted light from the emissive display 206 below may be predominately absorbed.

For discussion purposes, a diffuse pixel 220 is an element in which the diffusive display 212 configured in the scatter state 216. Likewise, a direct pixel 222 is an element in which the diffusive display 212 is configured in the clear state 214. Particularly when coupled with the emissive element, interesting visual effects are possible. For example, when the emissive display 206 element is in an active state 208 for a diffuse pixel 220, the overall apparent brightness of the pixel to the viewer 112 may increase due to a combination of emitted light and reflected scattered incident light. In some implementations, pixels in an area of the display configured for playback of video or animation may use the direct pixel 222 configuration.

Figure 3:
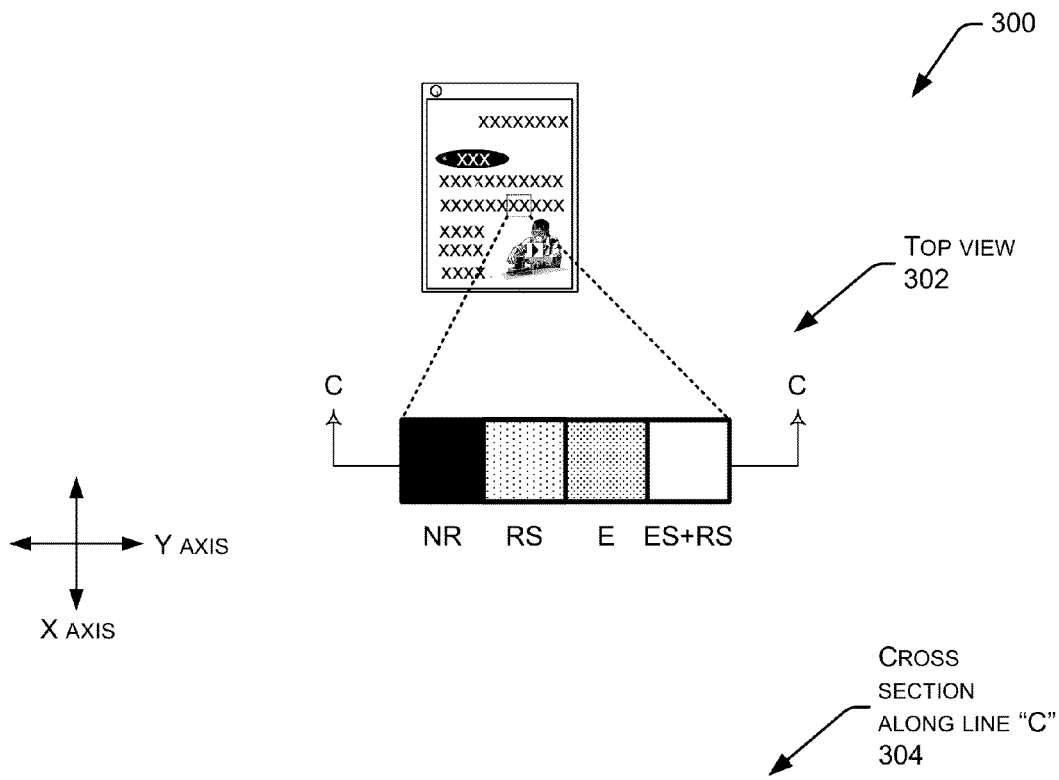
Figure 3:
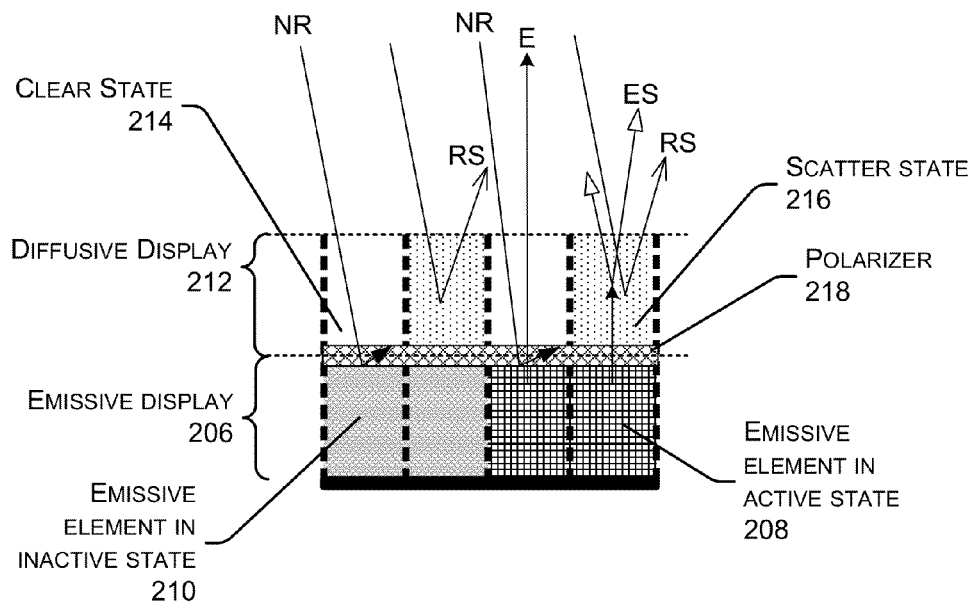

FIG. 3 illustrates another implementation 300 of the diffusive display coupled to the emissive display. In this implementation the polarizer 218 is disposed between the diffusive display 212 and the emissive display 206. This configuration improves the brightness of the images produced from the reflective scattered light and the non-reflected light by removing the polarizer 218 from the optical path. For example, incident light on the diffusive display 212 is not reduced by a polarizer and thus the reflections appear brighter.

In some implementations the interface between the diffusive display 212 and the polarizer 218 may contain an anti-reflective coating. Such a coating may improve penetration of incident light into the polarizer 218 and reduce reflections from the interface of the PNCLD 212 and the polarizer 218. An anti-reflective coating on the interface between the emissive display 206 and the polarizer 218 may also be used to improve optical coupling between the emissive display 206 and the diffusive display 212.

Figure 4:
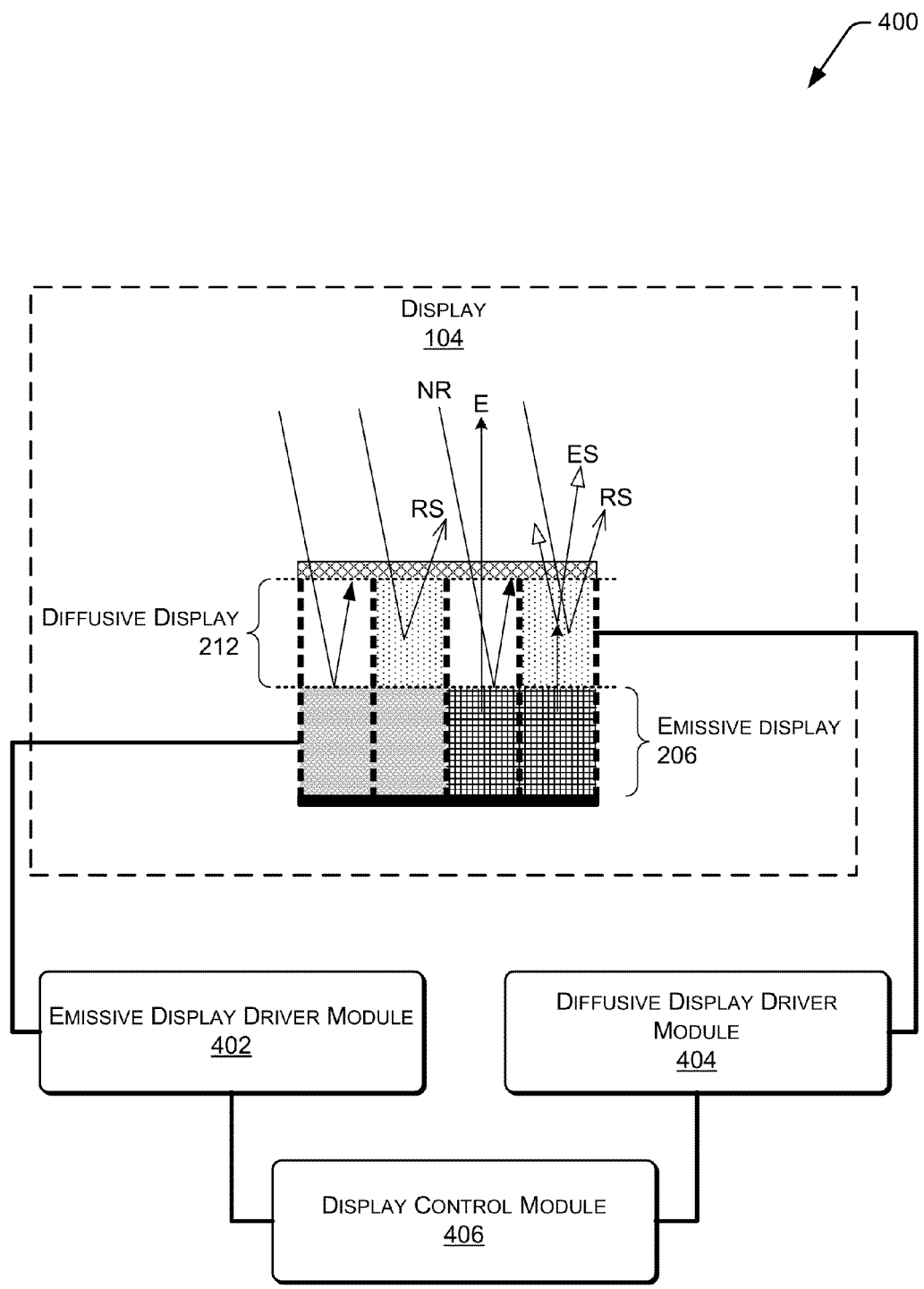
FIG. 4 is a schematic illustrating the display coupled to a diffusive display driver module with the emissive display coupled to an emissive display driver module. The driver modules in turn couple to the display control module.

FIG. 4 is a schematic 400 illustrating the display 104 and associated driver modules. An emissive display driver module 402 may operatively couple, such as by electrical conductors, to the emissive display 206. Emissive display driver module 402 is configured to manipulate the state of elements in the emissive display 214. For example, reflective display driver module 402 may change an emissive element from an inactive state 210 to an active state 208 to create a lit pixel and vice versa.

A diffusive display driver module 404 may operatively couple, such as by electrical conductors, to the diffusive display 212. The diffusive display driver module 404 is configured to manipulate the state of elements in the diffusive display 212. For example, the reflective display driver module 404 may change a pixel from a clear state 214 to a scatter state 216 and vice versa.

The emissive display driver module 402 and the diffusive display driver module 404 may couple to a display control module 406, which may coordinate the operation to generate an image for presentation to the viewer 112. For example, when configuring the portion of the display 104 to present colored text, the display control module 406 may provide the coordinates of the colored pixels comprising the colored text to the diffusive display driver module 404 to set elements within those coordinates to the clear state 214. In addition, the display control module 406 may also instruct the emissive display driver module 402 to activate emissive elements in the designated portion, generating the colored text.

In an alternative implementation, a single driver module may be used to control both the diffusive display 212 and the emissive display 206. For example, a single driver module may alternatively drive elements of the diffusive display 212 and elements of the emissive display 206. Conversely, the single driver module may simultaneously drive elements of the diffusive display 212 and elements of the emissive display 206.

As described in this application, modules and engines may be implemented using software, hardware, firmware, or a combination of these. Moreover, the acts and methods described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other tangible medium which can be used to store the desired information and which is accessible by a computing device.

Illustrative Construction and Operation

The processes described in this disclosure may be implemented by the architecture described herein or by other architectures. Each process or sub-process is illustrated as a collection of blocks in a logical flow graph that represent a sequence of operations which can be implemented during assembly, in hardware, software, or a combination thereof. In the context of software, the blocks represent computer-executable instructions that may be stored on one or more computer-readable storage media and that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is also understood that in some implementations various steps in the processes may be omitted or their order changed.

Figure 5:
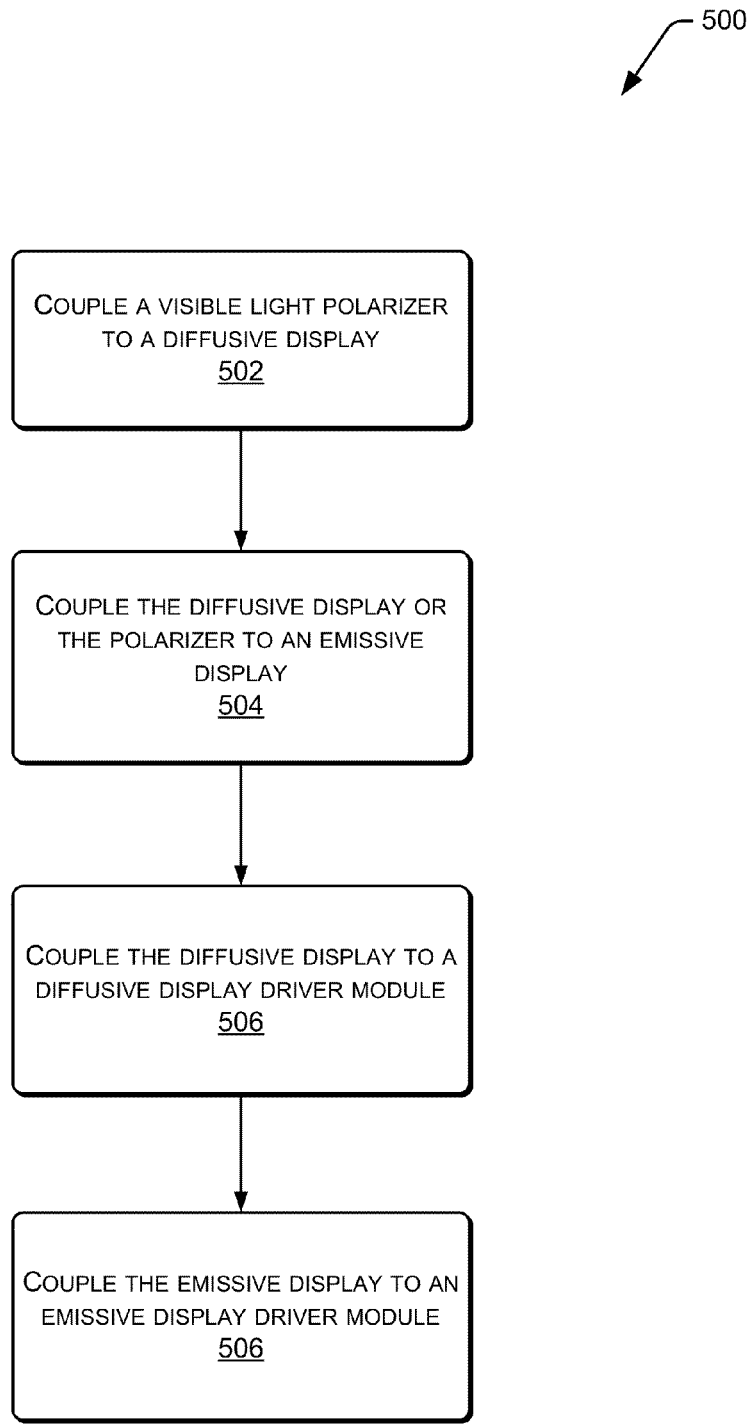
FIG. 5 is an illustrative process of building the display comprising the diffusive display and an emissive display.

FIG. 5 is an illustrative process 500 of building the display of FIG. 2 or 3 comprising the diffusive display and an emissive display with an integrated polarizer. At 502, a visible light polarizer 218 is coupled to the diffusive display 212. This coupling may include lamination, mechanical fasteners, adhesives, interference fit, and so forth. At 504, the diffusive display is coupled to an emissive display 206. In one implementation the diffusive display 212 may be coupled to the emissive display 206 such that the polarizer 218 is between the diffusive display 212 and the emissive display 206. In another implementation, the diffusive display 212 may be coupled to the emissive display 206 such that the polarizer 218 is proximate to the viewer 122 and the diffusive display 212 is adjacent to the emissive display 206.

At 506, the diffusive display 212 is coupled to the diffusive display driver module 404. At 508, the emissive display 206 is coupled to the emissive display driver module 402.

Figure 6:
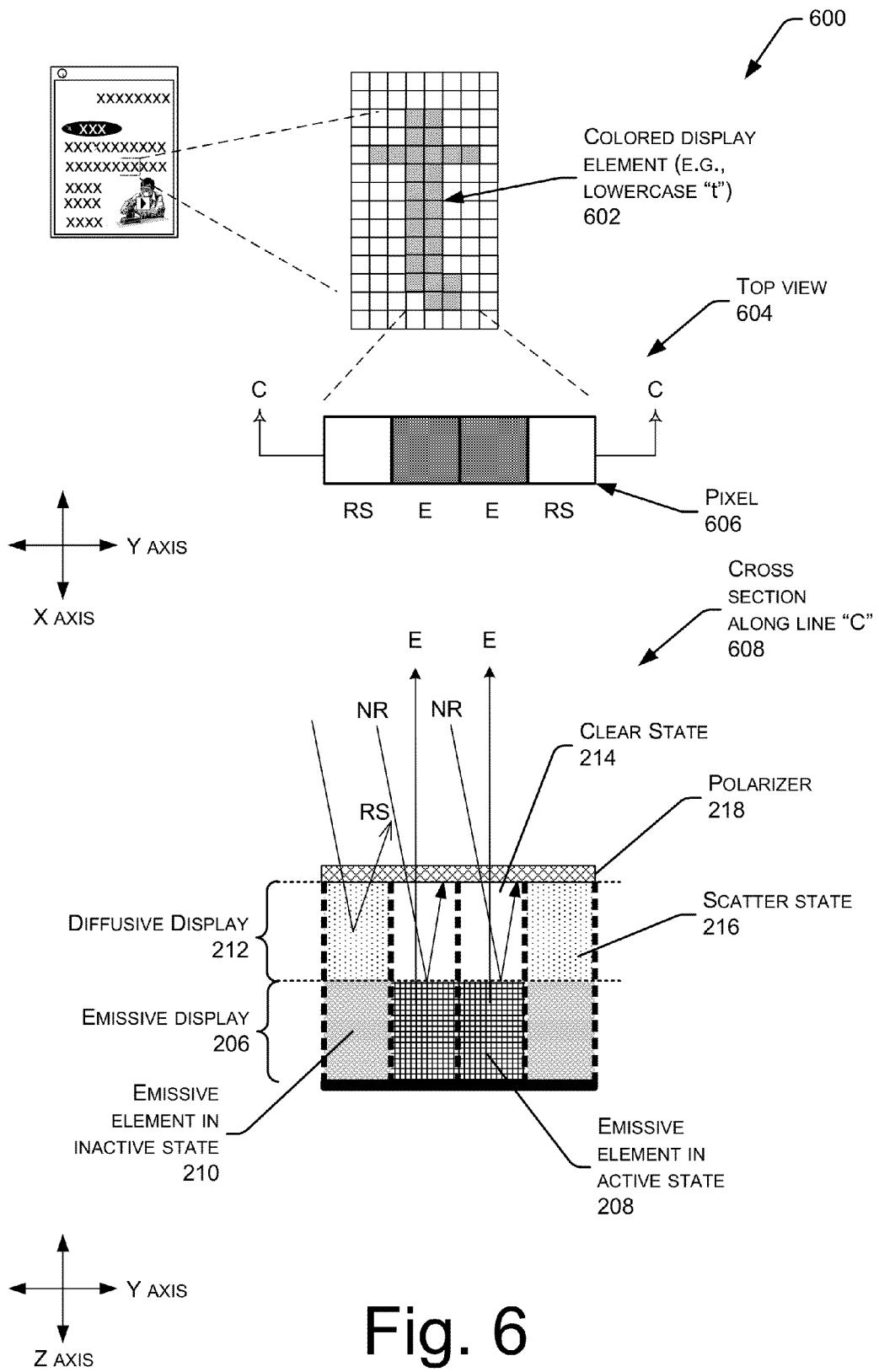
FIG. 6 illustrates generation of a colored pixel using the display.

FIG. 6 illustrates generation 600 of a colored pixel using the display of FIGS. 2 and 3. In this illustration, a colored display element 602, such as a lowercase "t", is to be presented to the viewer 112 on the display 104. As shown in the top view 604, four pixels 606 are shown. The outermost two pixels 606 are configured to a reflective scatter state and thus reflect at least part of the ambient light, while the two innermost pixels 606 are configured to emit colored light.

In some implementations where background lighting is desired, the outermost pixels may also be configured to emit light, operating in the emitted scattered and reflected scattered (ES+RS) mode. This background lighting may act as a backlight or partial backlight in some implementations.

As shown in the cross section 608 along line "C", the outmost pixels 606 are configured into a scatter state 216. The reflected scattered light gives them the appearance of being white, providing a white background for the colored display element 602. In some implementations, such as when the ambient light is minimal, these pixels may be backlit by the emissive display 206. The two innermost pixels are configured in a clear state 214 and the complementary emissive display 206 elements are in the active state 208, emitting colored light. For example, where the emissive display 206 comprises an OLEDD and the colored display element 602 is colored blue, the emissive display 206 may emit blue light at those pixels 606. In some implementations, the colored display element 602 may also be generated by using diffuse pixels 220 to create a desired hues or saturation of the color.

The light may be further modulated by altering the state of the diffusive display 212 elements and taking advantage of the persistence of human vision and the relatively slow response of human visual receptors. For example, the state of the element may be toggled between clear 214 and scatter 216 to produce an intermediate value, such as a pastel color.

The diffusive material may be colored in some implementations, such as with a dye. When in the scatter state, the color would be presented to the user, while in the clear state no color is presented. In yet another implementation, the clear state may be configured to affect the color of light but leave polarization and direction of light travel substantially unaffected.

Multiple diffusive display layers may be stacked in some implementations. Each diffusive display layer may be configured with different dyes or filters as described above. For example, a three layer stack may comprise a layer with a cyan dye or filter, layer with a yellow dye or filter, and a layer with a magenta dye or filter.

Figure 7:
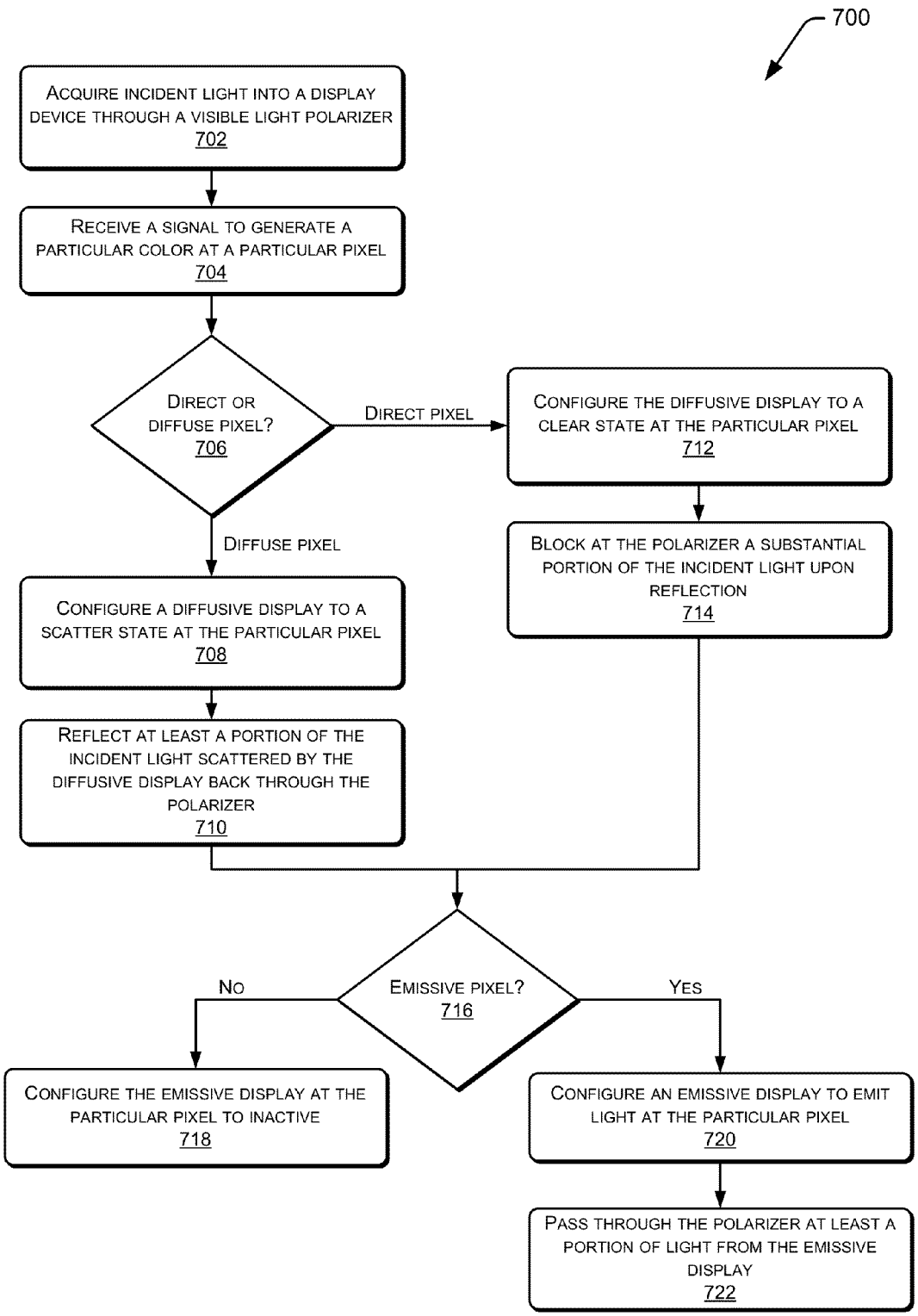
FIG. 7 is an illustrative process of generating an image on the display.

FIG. 7 is an illustrative process 700 of generating an image on the display. At 702, incident light is acquired into the display device through a visible light polarizer 218. At 704, a signal to generate a particular color at a particular pixel is received, such as at the display driver modules.

At 706, a determination is made whether to configure the pixel as a direct or diffuse pixel. When a diffuse pixel is called for, the process proceeds to 708. At 708, the diffusive display 212 at the particular pixel is configured to the scatter state 216. At 710, at least a portion of the light incident upon the diffusive display is scattered by the diffusive material back through the polarizer 218. Because of polarity changes occurring during the scattering, at least a portion of this light is able to pass through the polarizer 218 to the viewer 112.

Returning to 706, when the direct pixel is called for, the process proceeds to 712. At 712, the diffusive display 212 is configured to the clear state 214 at the particular pixel. This clear state allows light incident to pass without significant alteration. At 714, the polarizer 218 blocks a substantial portion of the reflected incident light.

At 716, a determination is made whether the pixel is to be emissive or not. When the pixel is not to be emissive, the process proceeds to 718. At 718, the emissive display 206 at the particular pixel is configured to the inactive state 210.

When the determination of 716 is that the pixel is to be emissive, the process proceeds to 720. At 720, the emissive display 206 is configured to emit light at the particular pixel. Where the emissive display 206 is capable of generating different colors of light, the color may be selected as called for by the signal to generate the particular color.

At 722, at least a portion of the light from the emissive display 206 is passed through the polarizer 218 and the diffusive display 212, to the viewer 112. When the diffusive display 212 is in the scatter state 216, the emitted light itself may be scattered.

Manipulation of Subpixels

Figure 8:
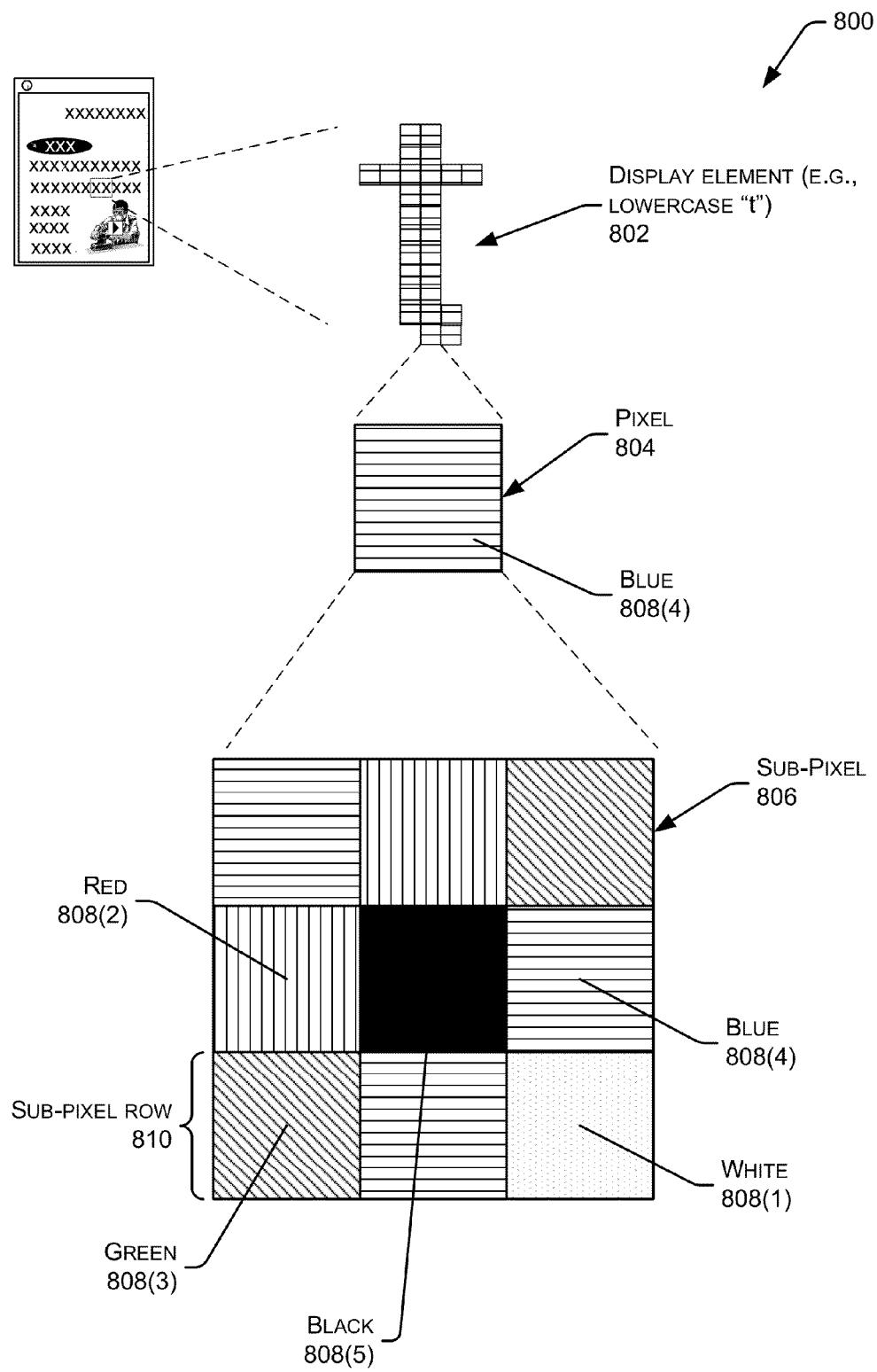
FIG. 8 is a schematic of a pixel comprising a plurality of sub-pixels.

FIG. 8 is a schematic 800 of a pixel comprising a plurality of sub-pixels. As shown here, a display element 802 may be presented to the viewer 112 on the display 104. Each display element 802 comprises one or more pixels 804. Each pixel 804 may comprise elements such as the diffusive display 212, emissive display 206, polarizer 218, or various arrangements thereof.

Each pixel 804 in turn may comprise a plurality of sub-pixels 806. This illustration shows a 3×3 array of approximately square sub-pixels. In other implementations different array sizes and shapes may be used. Furthermore, sub-pixels 804 may differ in size, shape, or both, from one another. For example, the sub-pixels may be hexagonal.

In this illustration the sub-pixels 806 are configured so that they generate different colors of light while in operation. The selection of colors that comprise the sub-pixels may vary depending upon desired characteristics of the display. Here, each pixel comprises a white sub-pixel 808(1), two red sub-pixels 808(2), two green sub-pixels 808(3), two blue sub-pixels 808(4), and a black sub-pixel 808(5). For ease of description, a sub-pixel row 810 of the green 808(3), blue 808(4), and white 808(1) is designated. Control of the incident light, emitted light, or both on each of these sub-pixels, allows for generation of a variety of colors from these sub-pixels 806.

Figure 9:
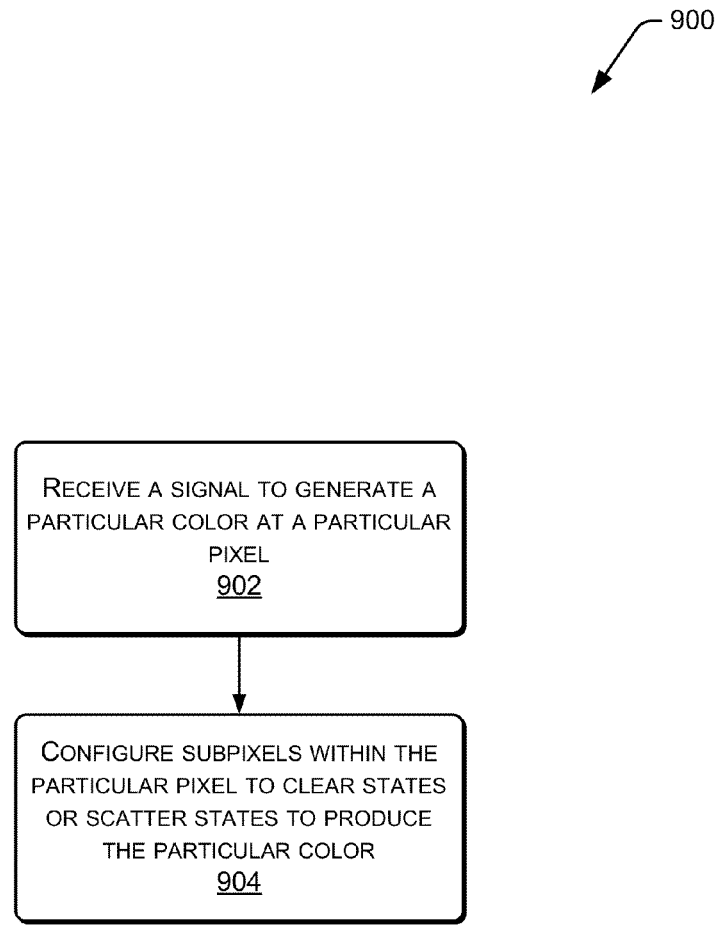
FIG. 9 is an illustrative process of altering the state of the diffusive display within the display at various sub-pixels to generate a particular color for the pixel.

FIG. 9 is an illustrative process 900 of altering the state of the diffusive display 212 within the display 102 at various sub-pixels 806 to generate a particular color for the overall pixel 804. At 902, a signal is received to generate a particular color at a particular pixel. For example, the signal may instruct the particular pixel to produce red.

At 904, the diffusive material of the sub-pixels 806 are configured within the particular pixel to clear states or scatter states as desired to produce the particular color. For example, where the display 102 is as described above with respect to FIGS. 2-3, the red sub-pixels 808(2) may be set to the clear state 214 and the emissive display 206 configured to emit 208 red light while the remaining sub-pixels 806 are configured to clear 214 and inactive 210.

Where the display comprises a reflective display such as described below with regards to FIG. 10, the red sub-pixels 808(2) may be set to the scatter state 214 so they reflect red light while the remaining sub-pixels are set to clear and absorb the incident light.

Figure 10:
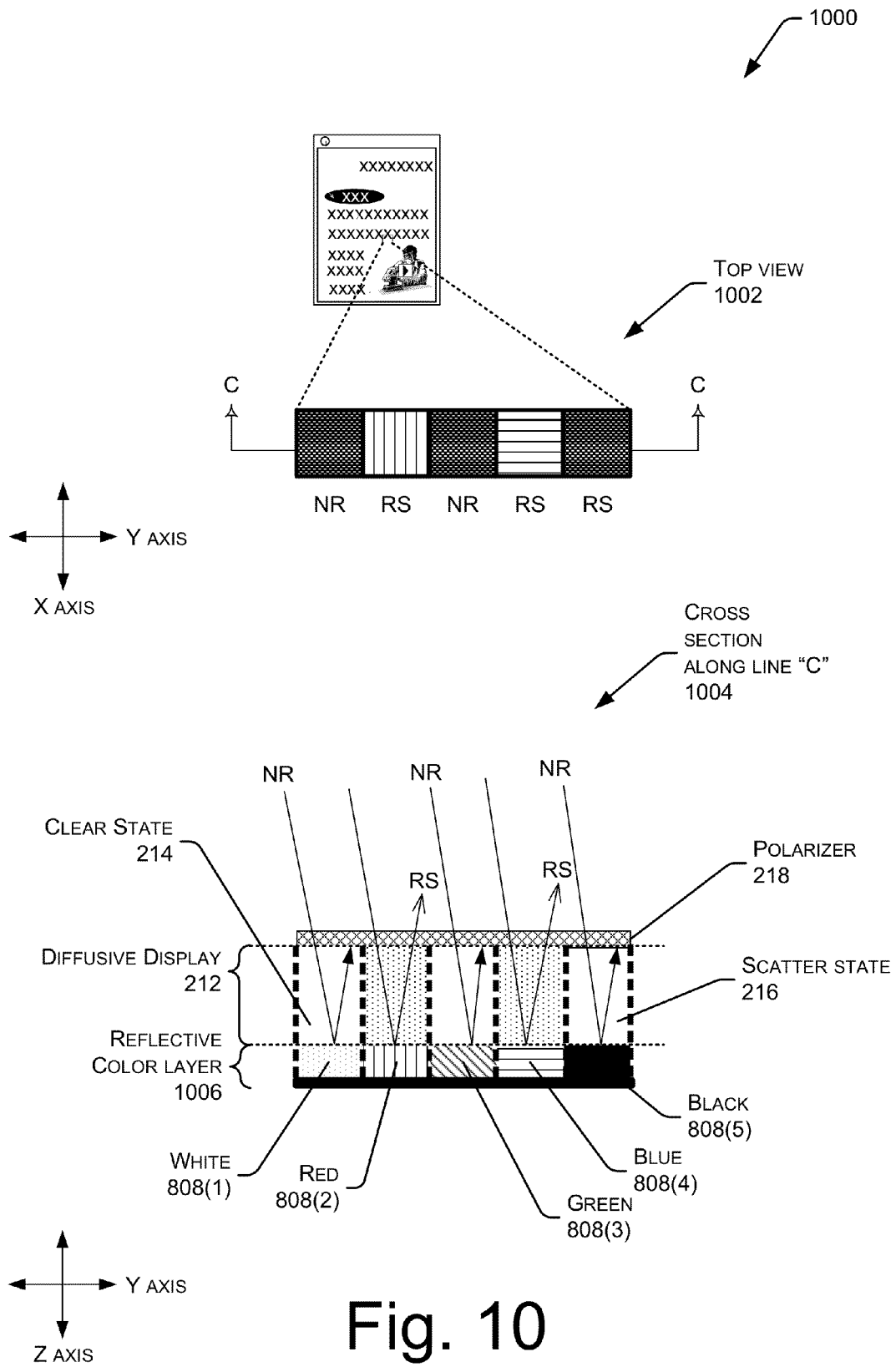
FIG. 10 illustrates a reflective diffusive display configured to generate a color image using incident light.

FIG. 10 illustrates a reflective diffusive display 1000 configured to generate a color image using incident light. In some implementation it may be desirable to omit the emissive display 206 and use the diffusive display in a totally reflective mode. The reflective diffusive display 1000 offers the rapid transitions necessary to support full motion video, but uses little power compared to an emissive display. Additionally, the reflective diffusive display 1000 uses incident ambient light and thus does not suffer from "wash out" in high illumination areas such as in direct sunlight.

In this illustration, a top view 1002 of a row of five sub-pixels 806 is shown. These sub-pixels 806 may be combined with additional sub-pixels 806 to form a pixel 804.

A cross section along line "C" at 1004 reveals the interior of the reflective diffusive display. The polarizer 218 is disposed proximate to the viewer 112 and coupled to the diffusive display 212 on a first side. In some implementations, the polarizer 218 may be omitted. A reflective color layer 1006 is coupled to a side of the diffusive display 212 opposite the polarizer 218. This reflective color layer 1006 comprises a pattern of colors suited to the colors that the display is configured to generate. For example, as shown here the reflective color layer 1006 may comprise a pattern of white 808(1), red 808(2), green 808(3), blue 808(4), and black 808(5) sub-pixels.

By altering the state of the diffusive display 212 for particular sub-pixels, various colors may be generated from broad spectrum incident light. For example, a deep purple color may be produced by placing the red sub-pixels 808(2) and the blue sub-pixels 808(4) into the scatter state 216, thus resulting in red and blue reflected scattered light, while the other colored sub-pixels are placed into the clear state 214 such that incident ambient light is not reflected. As described above, various colors and characteristics of the reflected light may be provided by modulating the state of the diffusive display 212 elements.

In some implementations where a monochrome display is desired, the individual pixels may be colored, and the sub-pixels omitted. For example, in a black and white display, the reflective color layer behind the pixel may comprise an entirely white or reflective background.

Figure 11:
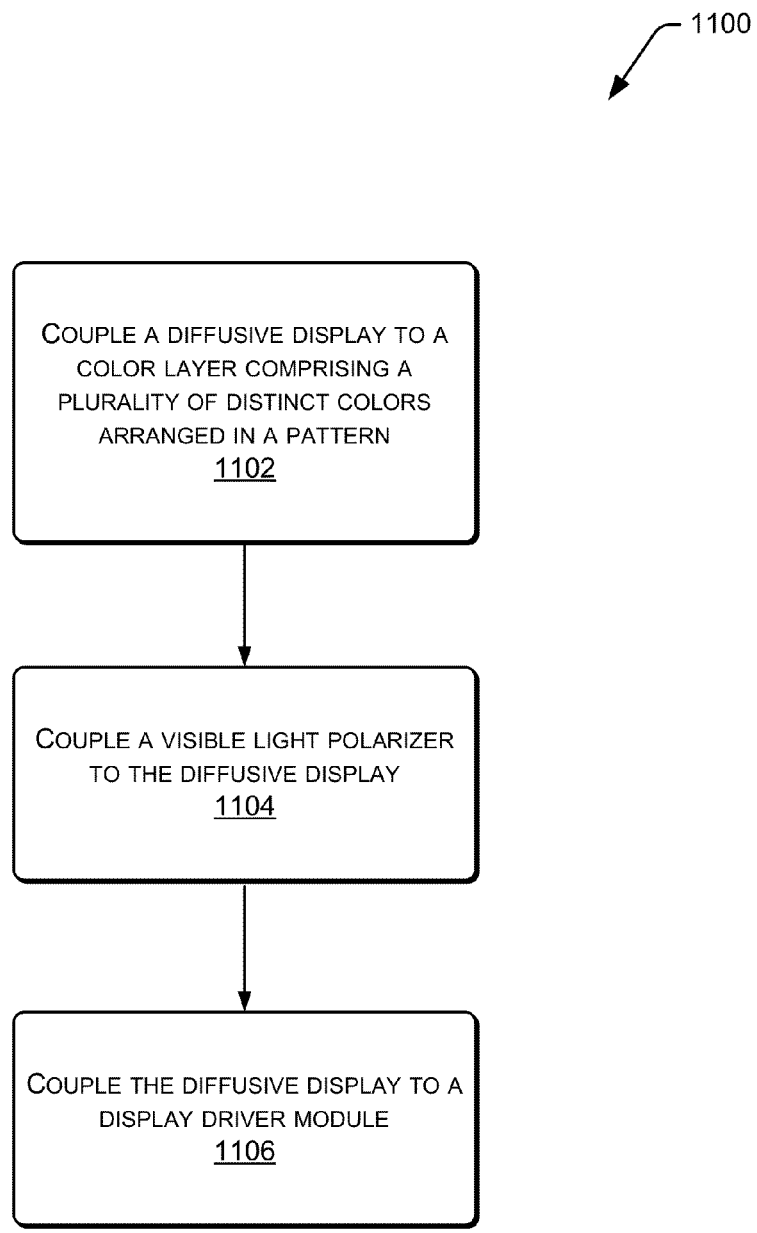
FIG. 11 is an illustrative process of constructing the reflective diffusive display.

FIG. 11 is an illustrative process 1100 of constructing the reflective diffusive display of FIG. 10. At 1102, the diffusive display 212 is coupled to a reflective color layer 1006 comprising a plurality of distinct colors which are arranged in a pattern. For example, a grid may be arranged with red, green, blue, black, and so forth corresponding to the locations of sub-pixels 806.

At 1104, the diffusive display 212 is coupled to the visible light polarizer 218. The polarizer 218 is disposed on a side of the diffusive display 212 opposite the reflective color layer 1006, such that incoming ambient light passes through the polarizer 218 before striking the reflective color layer 1006. At 1106, the diffusive display 212 is coupled to the diffusive display driver module 404.

Figure 12:
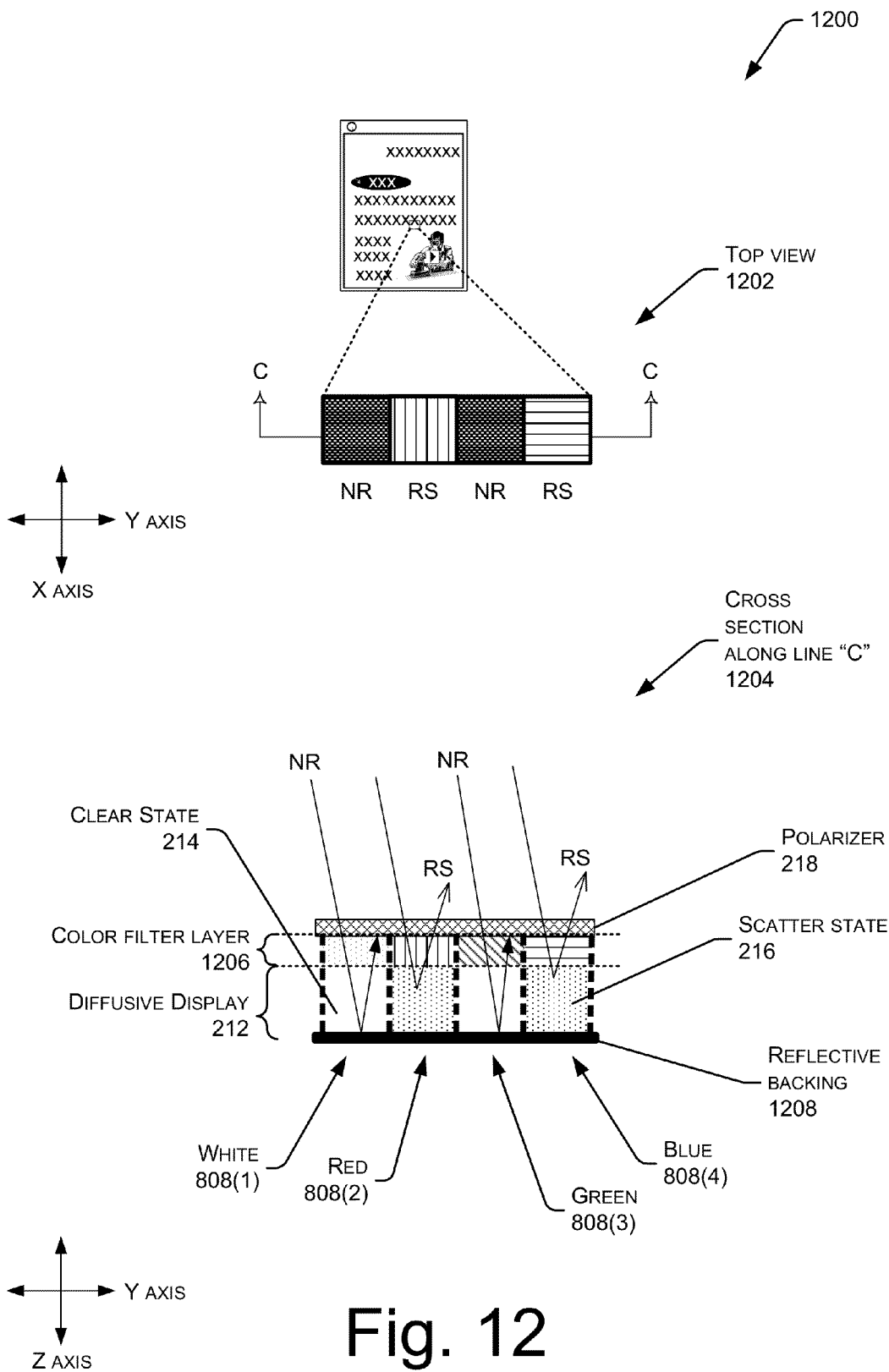
FIG. 12 illustrates a reflective color filter diffusive display configured to generate a color image using incident light.

FIG. 12 illustrates a reflective color filter diffusive display 1200. A top view 1202 of a row of four sub-pixels 806 is shown. As described above, these sub-pixels 806 may be combined with additional sub-pixels 806 to form a pixel 804.

A cross section along line "C" at 1204 reveals the interior of the reflective color filter diffusive display. The polarizer 218 is disposed proximate to the viewer 112 and coupled to a first side of a color filter layer 1006. In some implementations, the polarizer 218 may be omitted. The color filter layer 1206 is configured to pass pre-selected colors of light. Each sub-pixel 806 has a filter in the color filter layer 1206 for a different color of light. Coupled to a second side of the color filter layer 1206 opposite the polarizer 218 is the diffusive display 212. On an opposing side of the diffusive display 212 is a reflective backing 1208.

The reflective color filter diffusive display 1200 generates a color image by modulating the passage of light in the sub-pixels with the polymer network liquid crystals. As described above, when the diffusive display 212 for the sub-pixel 806 is in the clear state 214, incident ambient light is not reflected to the viewer 112, and is blocked by the polarizer 218. When the diffusive display 212 for the sub-pixel 806 is in the scatter state 216, at least a portion of the incident ambient light scatters and is reflected back to the viewer 112.

Figure 13:
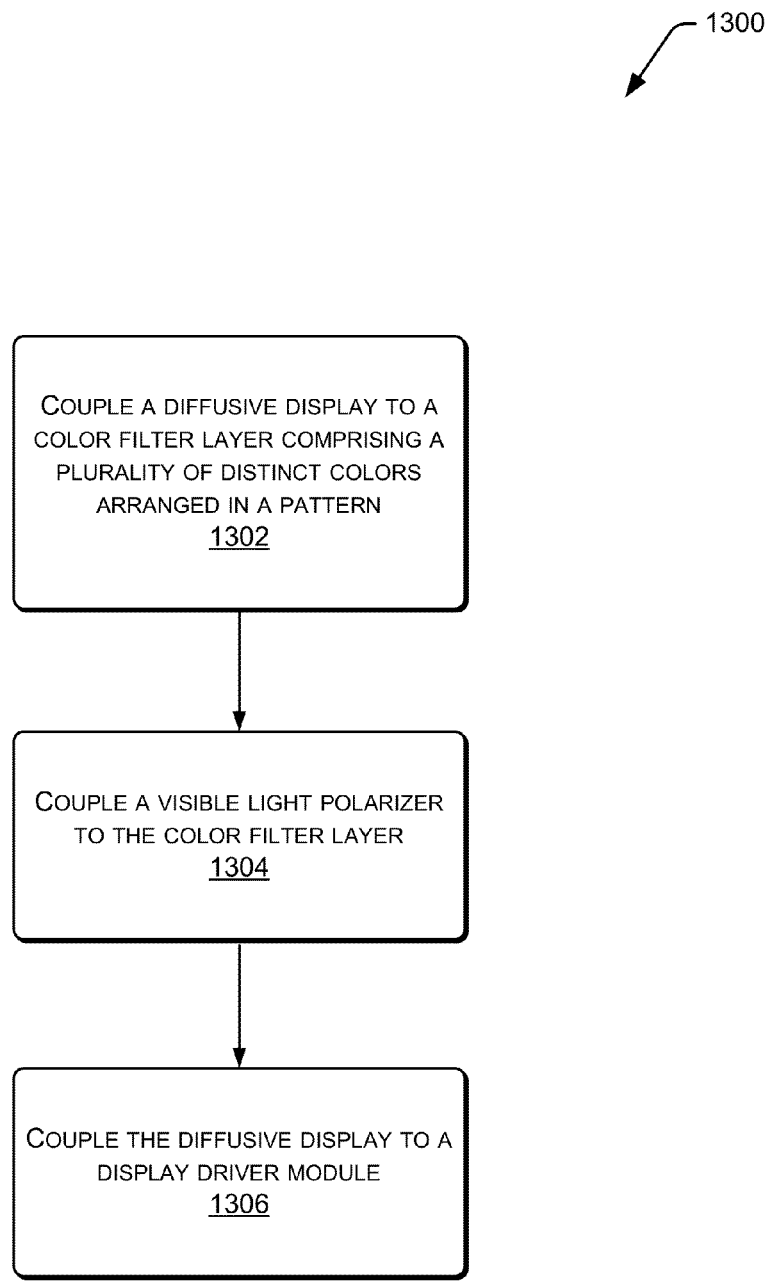
FIG. 13 is an illustrative process of constructing the reflective color diffusive display.

FIG. 13 is an illustrative process 1300 of constructing the reflective color diffusive display. At 1302, the diffusive display 212 is coupled to a color filter layer 1206 comprising a plurality of distinct colors which are arranged in a pattern. For example, a grid may be arranged with red, green, blue, black, and so forth corresponding to the locations of sub-pixels 806.

At 1304, the visible light polarizer 218 is coupled to the color filter layer 1206. The polarizer 218 is disposed on a side of the color filter layer 1206 opposite that of the diffusive display 212, such that incoming ambient light passes through the polarizer 218 and the color filter layer 1206 before striking the reflective backing 1208. At 1306, the diffusive display is coupled to the diffusive display driver module 404.

CONCLUSION

Although the subject matter has been described in language specific to structural features and/or methodological acts, it is to be understood that the subject matter defined in the appended claims is not necessarily limited to the specific features or acts described herein. Rather, the specific features and acts are disclosed as illustrative forms of implementing the claims. For example, the methodological acts need not be performed in the order or combinations described herein, and may be performed in any combination of one or more acts.

What is claimed is:

1. A display device comprising:
    a polymer network liquid crystal display (PNLCD) configured to maintain a scatter state or a clear state;
    a visible light circular polarizer coupled to the PNLCD; and
    an organic light emitting diode display (OLEDD) positioned behind the PNLCD and configured to emit light through the PNLCD and the visible light circular polarizer.

2. The display device of claim 1, wherein the scatter state is configured to scatter at least a portion of light incident to the PNLCD such that polarization of at least a portion of the incident light is altered.

3. The display device of claim 2, wherein the incident light is altered from a first polarization to a second, different polarization.

4. The display device of claim 1, wherein the clear state is configured to leave polarization of light incident to the PNLCD substantially unaffected.

5. The display device of claim 1, wherein the OLEDD comprises elements configured to generate different colors of light.

6. The display device of claim 1, further comprising an interface between the OLEDD and the PNLCD, and wherein the interface acts as a reflector to light incident upon the OLEDD.

7. The display device of claim 1, wherein the visible light circular polarizer is disposed atop the PNLCD.

8. The display device of claim 1, wherein the visible light circular polarizer is disposed between the PNLCD and the OLEDD.

9. The display device of claim 1, further comprising a first control module coupled to the PNLCD and a second, different control module coupled to the OLEDD.

10. A display device comprising:
    a diffusive display configured to maintain a scatter state or a clear state;
    a visible light polarizer coupled to the diffusive display; and
    an emissive display positioned behind the diffusive display and configured to emit light through the diffusive display and the visible light polarizer.

11. The display device of claim 10, wherein the diffusive display comprises a cholesteric display.

12. The display device of claim 10, wherein the scatter state is configured to scatter at least a portion of light incident to the diffusive display such that polarization of at least a portion of the incident light is altered.

13. The display device of claim 12, wherein the incident light is altered from a first polarization to a second, different polarization.

14. The display device of claim 10, wherein the emissive display comprises elements configured to generate different colors of light.

15. The display device of claim 10, further comprising an interface between the emissive display and the diffusive display, and wherein the interface acts as a reflector to light incident upon the emissive display.

16. The display device of claim 10, wherein the visible light polarizer comprise a circular polarizer.

17. A method comprising:
    coupling a visible light polarizer to a diffusive display; and
    coupling the diffusive display to an emissive display.

18. The method of claim 17, wherein the diffusive display comprises a polymer network liquid crystal display (PNLCD) and the visible light polarizer comprises a circular polarizer disposed between the PNLCD and the emissive display.

19. The method of claim 17, wherein the visible light polarizer is disposed between the diffusive display and the emissive display.

20. The method of claim 17, wherein the visible light polarizer is disposed on a first side of the diffusive display and the emissive display couples to an opposing second side of the diffusive display.

21. The method of claim 17, wherein the emissive display comprises an organic light emitting diode display (OLEDD).

22. The method of claim 17, further comprising coupling the diffusive display to a diffusive display driver module and the emissive display to an emissive display drive module.

23. A display method comprising:
    acquiring incident light into a display device through a visible light polarizer;
    receiving a signal to generate a particular color at a particular pixel of the display device;
    when the signal generates a diffuse pixel:
        configuring a diffusive display to a scatter state at the particular pixel such that the diffusive display scatters the incident light; and
        reflecting at least a portion of the incident light scattered by the diffusive display back through the polarizer; and when the signal generates a direct pixel:
        configuring the diffusive display to a clear state at the particular pixel such that the diffusive display passes the incident light; and
        blocking at the polarizer a substantial portion of the incident light upon reflection.

24. The display method of claim 23, further comprising modulating the diffusive display between the scatter state and the clear state at the particular pixel to alter intensity of the reflected light.

25. The display method of claim 23, further comprising, when the particular pixel is an emissive pixel:
    configuring the emissive display to emit light at the particular pixel; and
    passing through the polarizer at least a portion of emitted light from the emissive display.

26. The display method of claim 25, further comprising modulating the diffusive display between the scatter state and the clear state at the particular pixel to alter intensity of the reflected light or the emitted light.

27. A display device comprising:
   a diffusive display configured to maintain a scatter state or a clear state within a plurality of sub-pixels, each sub-pixel configured to generate one or more colors of visible light; and
   a visible light polarizer coupled to the diffusive display.

28. The display device of claim 27, wherein at least one sub-pixel of the plurality generates the one or more colors of visible light by reflection from a colored surface.

29. The display device of claim 27, wherein at least one sub-pixel of the plurality generates the one or more colors of visible light by emission of visible light.

30. The device of claim 27, wherein at least one sub-pixel of the plurality generates the one or more colors of visible light by reflection and emission of visible light.

31. The display device of claim 27, further comprising an emissive display coupled to the diffusive display and configured to emit light through the diffusive display and the visible light polarizer.

32. One or more computer-readable media storing computer-executable instructions that, when executed, cause one or more processors to perform acts comprising:
   receiving a signal to generate a particular color at a particular pixel of a diffusive display coupled to a polarizer; and
   configuring a plurality of sub-pixels of the diffusive display within the particular pixel to clear states or scatter states to produce, at least in part, the particular color.

33. The one or more computer-readable storage media of claim 32, further comprising configuring an emissive display element coupled to the diffusive display to emit light at one or more sub-pixels of the plurality.

34. A method comprising:
   coupling a diffusive display configured to change particular pixels between a clear state and a scatter state to a color layer comprising a plurality of distinct colors arranged in a pattern; and
   coupling a visible light polarizer to the diffusive display.

35. The method of claim 34, further comprising coupling the diffusive display to a display driver module.

36. The method of claim 34, wherein the color layer is configured to reflect incident light of a specific color.

37. The method of claim 34, wherein the color layer is configured to filter incident light of a specific color.

38. The method of claim 34, wherein the color layer is disposed between the diffusive display and the visible light polarizer.

* * * * *